(12) United States Patent
Merín Celemín et al.

(10) Patent No.: US 6,660,421 B2
(45) Date of Patent: Dec. 9, 2003

(54) SYSTEM FOR STORING FUEL IN A HANDHELD DEVICE

(75) Inventors: Piedad Gemma Merín Celemín, Madrid (ES); Carlos Quiñones De La Guia, Madrid (ES); Mauel Vázquez López, Madrid (ES); Christopher Rouverand, Asniéres sur Seine (FR); Jean Marc Bertelli, Colombes (FR)

(73) Assignee: Alcatel, Paris (FR)

( * ) Notice: Subject to any disclaimer, the term of this patent is extended or adjusted under 35 U.S.C. 154(b) by 126 days.

(21) Appl. No.: 09/909,888

(22) Filed: Jul. 23, 2001

(65) Prior Publication Data

US 2002/0018925 A1 Feb. 14, 2002

(30) Foreign Application Priority Data

Jul. 24, 2000 (ES) ............................................ 200001844

(51) Int. Cl.⁷ .................... H01M 8/00; H01M 2/00; H01M 2/02; H01M 2/08
(52) U.S. Cl. .............................. 429/34; 429/12; 429/35
(58) Field of Search ............................... 429/12, 13, 34, 429/35, 38, 39

(56) References Cited

U.S. PATENT DOCUMENTS

| 5,220,919 A | * | 6/1993 | Phillips et al. ............... 600/345 |
| 6,095,799 A | * | 8/2000 | McDonough et al. ........ 431/255 |
| 6,268,077 B1 | * | 7/2001 | Kelley et al. .................. 429/33 |
| 6,289,888 B1 | * | 9/2001 | Welles .................... 126/263.01 |
| 6,460,733 B2 | * | 10/2002 | Acker et al. ................... 222/94 |

* cited by examiner

Primary Examiner—Randy Gulakowski
Assistant Examiner—Donald V. Scaltrito
(74) Attorney, Agent, or Firm—Sughrue Mion, PLLC

(57) ABSTRACT

A system for storing fuel in a handheld device that has a housing (11) made up of a set of pieces that define a receptacle inside which are housed a plurality of electronic circuits (23) and a fuel cell stack. The fuel cell stack transforms the chemical energy stored by a fuel into electrical energy so that fuel is contained in a container suitable for occupying a free space (22) between the electronic circuits (23) and the housing (11).

8 Claims, 1 Drawing Sheet

SYSTEM FOR STORING FUEL IN A HANDHELD DEVICE

OBJECT OF THE INVENTION

The present invention relates to a handheld device that is capable of containing in itself a fuel suitable for use by an electrochemical device such as a fuel cell stack.

Said fuel cell stack carries out the conversion, in a continuous manner, of the chemical energy stored by the fuel into electrical energy suitable for the correct operation of the electric circuits and other components included in the mobile apparatus.

The use of the fuel cell stack in handheld devices is mainly due to the fuel cell stack being capable of supplying more electrical energy than a traditional nickel-cadmium battery of comparable size and with less weight. The fuel cell stack does not require lengthy recharging, it is recharged quickly merely by adding fuel, since the fuel cell stack does not store energy like present day batteries, but produces it as long as it has fuel to do so.

Therefore, a handheld device that incorporates a fuel cell stack has great autonomy and mobility, since it is independent of whatever type of voltage source for its recharging.

STATE OF THE ART

It is known in the state of the art the existence of a fuel cell stack suitable for handheld devices such as a mobile telephone, computer or the like, which is fed with fuel from a replaceable container or receptacle, a cartridge, in which is held and transported a determined amount of said fuel such as methanol, or similar. The fuel cell stack is capable of obtaining electrical energy from the hydrogen atoms.

The handheld device has a specially enabled space for receiving the cartridge. Thus, when the fuel of the cartridge is exhausted, the latter must be withdrawn from the receptacle and substituted with another cartridge full of fuel, that is, the empty cartridge is substituted with a replacement, in a manner similar to what is done with, for example, a ball-point pen.

For which reason there is a need to develop a handheld device that is capable of containing therein a determined quantity of fuel, in such a manner that the size of the handheld device is reduced. In such a way that the handheld devices shall be compact in size and reduced in weight, in accordance with that required by the possible users thereof, maintaining an extended autonomy.

CHARACTERISATION OF THE INVENTION

It is an object of the invention to facilitate a handheld device capable of storing therein a fuel adequate for a fuel cell stack, also held in the mobile apparatus, extracting therefrom electrical energy in a continuous and adequate manner for the normal operation of the mobile apparatus, without the size thereof being penalised.

The handheld device consists of a set of electronic circuits that are enclosed or contained in a housing or casing. Said housing has a free space, commonly small, which is situated between the electronic circuits and/or between these and the housing in which they are held.

This free space defines a compartment that is suitable for being occupied by a kind of balloon or blister with a first interface (zone of communication) through which is carried out the filling of the balloon with the fuel from the exterior of the housing of the handheld device.

Likewise, the balloon also has a second interface, zone of action of the fuel on the fuel cell stack, in order that the latter produce the electrical energy.

BRIEF DESCRIPTION OF THE DRAWINGS

A more detailed explanation of the invention is provided in the following description, based on the figures attached, in which.

DESCRIPTION OF THE INVENTION

Figure 1:
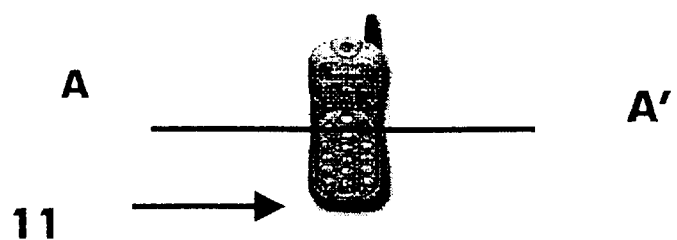
FIG. 1 shows a mobile telephone according to the invention.

In FIG. 1 can be seen the external aspect of a housing 11 that has relation with a handheld device such as a mobile telephone, which is employed here as an example in order to make a better description of the invention, it being possible for the present invention to be applied to other portable devices such as a computer, or the like.

Figure 2:
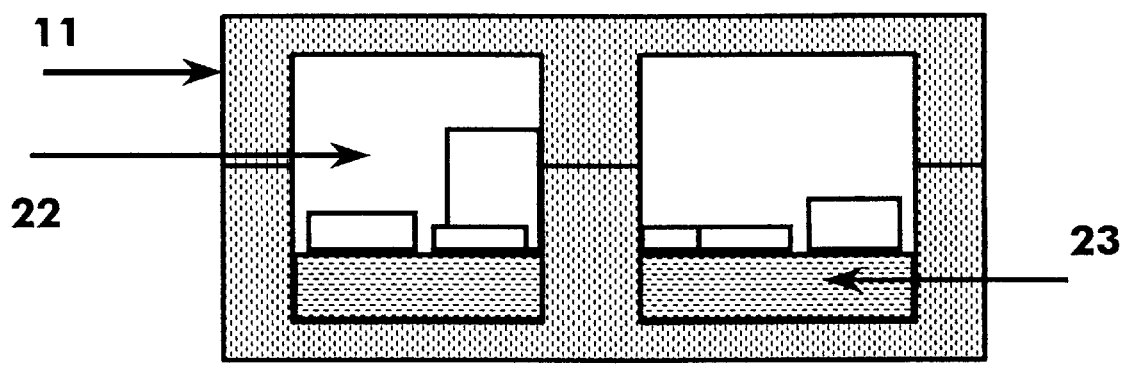
FIG. 2 shows a cross section viewed in elevation on the cut A–A', according to the invention.

In relation now with FIG. 2, the housing 11 is formed by a set of pieces that are assembled forming the mobile telephone, for example. A set of electronic circuits 23 is lodged in the inside of the housing. Said electronic circuits 23 carry out functions such as receiving and transmitting radio signals from and to a base station that is connected with a public switched telephone network PSTN, for example.

The electronic circuits 23 receive electrical energy from a fuel cell stack, not shown, which transforms directly, and in continuous fashion, the chemical energy stored by a fuel such as methanol, or similar.

Between the electronic circuits 23 and the pieces that form the housing 11 of the handheld device there is a free space 22, commonly small, which defines a compartment.

Figure 3:
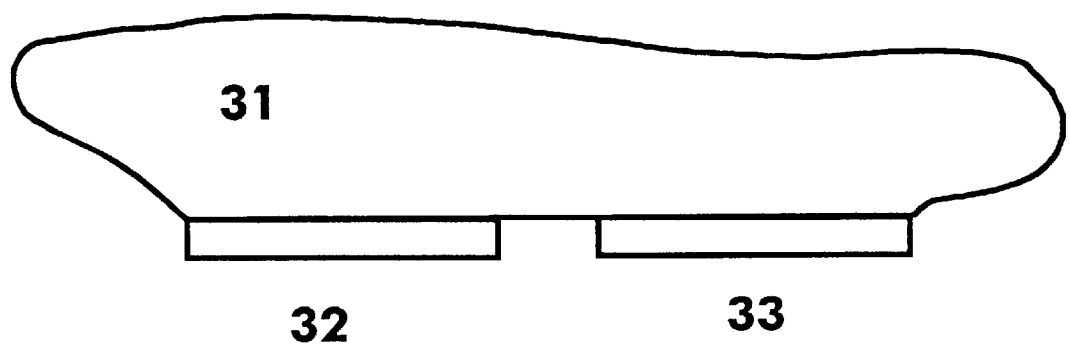
FIG. 3 shows a container according to the invention.

FIG. 3 shows a container 31 in the form of a balloon or blister that is suitable for occupying the compartment 22, and that is implemented in an elastic material, which is not altered through being in contact with the fuel, nor with the electronic circuits 23, nor with the temperature reached by some of the electronic components that form said electronic circuits 23.

The container 31 has a first interface 32, such as a valve or nozzle, through which the filling of the container 31 with the fuel is carried out from the exterior of the housing 11 of the handheld device.

Likewise the container 31 also has a second interface 33, zone of action of the fuel on the fuel cell stack, appropriate for the fuel cell stack to produce the electrical energy required during the normal operation of the handheld device.

The container 31 is capable of holding a determined quantity of fuel. When the container 31 is full of fuel, it adapts to the free volume 22 that is available within the housing 11.

In a further embodiment, the free volume 22, available within the housing 11, is filled with a solid substance capable of absorbing in its inside the liquid fuel.

As a result, the housing 11 of the handheld device contains within itself, in the free volume 22 left between the electronic circuits 23 and the housing 11, a determined quantity of fuel suitable for being used by the fuel cell stack also contained in the handheld device.

In both embodiments, both the container 31 and the solid substance are easily filled with the fuel, and the size of the handheld device is reduced, according to the market trend.

What is claimed is:

1. A system for storing fuel within a handheld device that has a housing (11) comprising at least one piece, within which there is held at least one electronic circuit (23) and a fuel cell stack that transforms the chemical energy stored by a fuel into electrical energy, wherein a container (31) is adapted for occupying a free space (22) between said electronic circuits (23) and said housing (11), wherein said container (31) is adapted for holding a determined quantity of said fuel, and is implemented in an elastic material that is not altered through being in contact with said fuel and said electronic circuits (23).

2. The system for storing fuel according to claim 1, wherein said container (31) includes a first interface (32) adapted for receiving said fuel and filling said container.

3. The system for storing fuel according to claim 1, wherein said container (31) includes a second interface (33) adapted for facilitating the communication of said fuel with said fuel cell stack.

4. The system for storing fuel according to claim 1, wherein said contain comprises a solid substance adapted for occupying said free space (22) between said electronic circuits (23) and said housing (11).

5. The system for storing fuel according to claim 4, wherein said solid substance is adapted in order to absorb a determined quantity of said fuel.

6. The system for storing fuel according to claim 4, wherein said solid substance is a material not altered through being in contact with said fuel and said electronic circuits (23).

7. The system for storing fuel according to claim 4, wherein said solid substance includes said first interface (32) adapted for receiving said fuel and wetting said solid substance.

8. The system for storing fuel according to claim 4, wherein said solid substance includes said second interface (33) adapted for facilitating the communication of said fuel with said fuel cell stack.

* * * * *